United States Patent
Schaefer et al.

(10) Patent No.: US 12,066,591 B2
(45) Date of Patent: Aug. 20, 2024

(54) VISIBLE QUALITY MIRROR FINISHING

(71) Applicant: Raytheon Company, Waltham, MA (US)

(72) Inventors: John P. Schaefer, Plano, TX (US); Martin Mather, Addison, TX (US); Paul Gasloli, Richardson, TX (US)

(73) Assignee: RAYTHEON COMPANY, Waltham, MA (US)

( * ) Notice: Subject to any disclaimer, the term of this patent is extended or adjusted under 35 U.S.C. 154(b) by 877 days.

(21) Appl. No.: 16/929,174

(22) Filed: Jul. 15, 2020

(65) Prior Publication Data

US 2022/0019001 A1    Jan. 20, 2022

(51) Int. Cl.
| | |
|---|---|
| G02B 5/08 | (2006.01) |
| B32B 15/00 | (2006.01) |
| B32B 18/00 | (2006.01) |
| B32B 38/00 | (2006.01) |
| C04B 41/00 | (2006.01) |
| C04B 41/52 | (2006.01) |
| C04B 41/90 | (2006.01) |

(52) U.S. Cl.
CPC ............ *G02B 5/0808* (2013.01); *B32B 15/00* (2013.01); *B32B 18/00* (2013.01); *B32B 38/0012* (2013.01); *C04B 41/009* (2013.01); *C04B 41/52* (2013.01); *C04B 41/90* (2013.01); *B32B 2038/0064* (2013.01); *B32B 2310/08* (2013.01); *B32B 2315/02* (2013.01)

(58) Field of Classification Search
None
See application file for complete search history.

(56) References Cited

U.S. PATENT DOCUMENTS

| | | | | |
|---|---|---|---|---|
| 4,643,543 | A * | 2/1987 | Mohn | G02B 5/0825 359/846 |
| 4,659,548 | A * | 4/1987 | Gubbay | B22F 3/15 419/48 |
| 6,921,177 | B2 * | 7/2005 | Schaefer | G02B 5/0808 359/884 |
| 9,575,223 | B2 | 2/2017 | Schaefer et al. | |
| 11,619,764 | B2 | 4/2023 | Schaefer et al. | |
| 2013/0057952 | A1 * | 3/2013 | Risse | C23C 14/0652 359/359 |
| 2013/0335816 | A1 * | 12/2013 | Kierey | G02B 5/1857 359/359 |
| 2015/0285958 | A1 * | 10/2015 | Comstock, II | G02B 1/12 82/1.11 |
| 2015/0293275 | A1 * | 10/2015 | Crifasi | G02B 5/0808 428/673 |
| 2017/0269265 | A1 * | 9/2017 | Benson | G02B 5/08 |

(Continued)

FOREIGN PATENT DOCUMENTS

WO    2020081157 A1    4/2020

*Primary Examiner* — John J Figueroa
(74) *Attorney, Agent, or Firm* — CANTOR COLBURN LLP

(57) ABSTRACT

According to one or more embodiments of the present invention, a mirrored apparatus includes a substrate with a non-metal inorganic material that is non-diamond turnable. The mirrored apparatus further includes a finish layer arranged on the surface of the substrate. The finish layer has a polished surface opposite the substrate. The mirrored apparatus also includes a reflective layer arranged on the polished surface of the finish layer.

20 Claims, 3 Drawing Sheets

(56) References Cited

U.S. PATENT DOCUMENTS

| | | |
|---|---|---|
| 2017/0292174 A1 | 10/2017 | Karabin et al. |
| 2022/0019002 A1* | 1/2022 | Schaefer ................ B33Y 70/10 |
| 2023/0280508 A1 | 9/2023 | Schaefer et al. |

* cited by examiner

VISIBLE QUALITY MIRROR FINISHING

BACKGROUND

The present disclosure relates to mirrors and, more particularly, to the structure and fabrication of high precision mirrors.

A variety of optical systems include high precision mirrors. Non-limiting examples of such applications include systems with ultraviolet lithography condenser mirrors, systems with reflective laser scanner mirrors, exo-atmospheric reflecting optics, and systems in which low scattering is needed for visible wavelength applications.

One technique for making precision mirrors is to take a high specific stiffness inorganic, or metal material, and shape the substrate using computer numerical control (CNC) grinding and machining processes, and then finish the optical surface to a mirror finish using optical manufacturing methods common in the trade.

SUMMARY

According to one or more embodiments of the present invention, a mirrored apparatus includes a substrate with a non-metal inorganic material that is non-diamond turnable. The mirrored apparatus further includes a finish layer arranged on the surface of the substrate. The finish layer has a polished surface opposite the substrate. The mirrored apparatus also includes a reflective layer arranged on the polished surface of the finish layer.

According to other embodiments of the present invention, a mirrored apparatus includes a substrate with an inorganic material that is non-diamond point turnable. The mirrored apparatus further includes a finish layer arranged on a surface of the substrate. The finish layer has a polished surface opposite the substrate. The mirrored apparatus also includes a reflective layer arranged on the polished surface of the finish layer.

According to some embodiments of the present invention, a method of making a mirrored apparatus includes providing a substrate with an inorganic material that is non-diamond point turnable. The method further includes depositing a finish layer on the surface of the substrate. The method includes polishing a surface of the finish layer opposite the substrate. The method also includes depositing a reflective layer on surface of the finish layer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
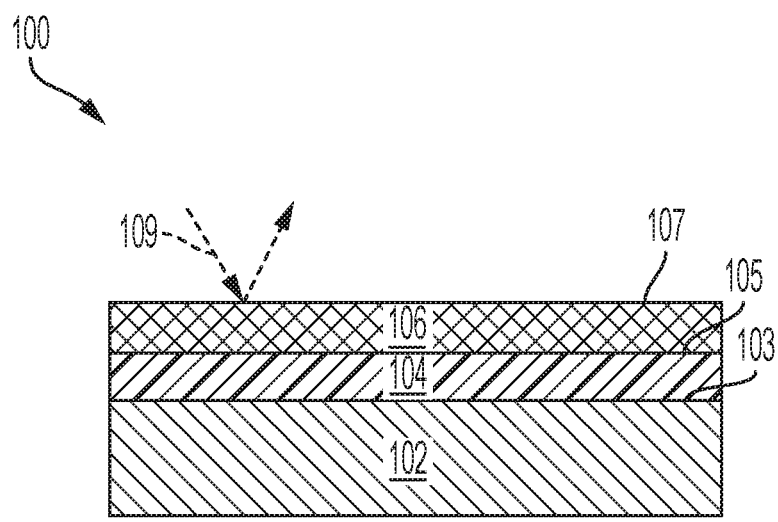
FIG. 1 depicts a fragmented cross-sectional side view of a mirror according to aspects of the present invention.

Although materials like beryllium and silicon carbide have many desirable mechanical properties for use in high precision mirrors, they are challenging to polish because they are produced from powders and therefore have a granular composition. Beryllium in particular is subject to corrosion or deep pitting during polishing and therefore the tribology of the process needs to be carefully controlled. Furthermore, even if the polishing process is carried out correctly, the material composition limits the achievable surface finish to around 40 angstrom root mean square (RMS) for beryllium, and around 50 angstroms RMS in silicon carbide. A 40 to 50 Angstrom RMS finish is problematic for most visible wavelength applications due to optical scatter, and therefore an alternate approach is needed.

Previous attempts to address these challenges, such as plating electroless nickel over the beryllium substrate, subjecting the nickel layer to diamond point turning (DPT), and then post-polishing the nickel layer to improve the surface finish, have disadvantages, such as bi-metallic bending over temperature due to the inherent mismatch between the coefficient of thermal expansion (CTE) of the substrate and the CTE for the plated nickel layer. Such bending is undesirable in the context of a high precision mirror surface because it changes optical characteristics of the mirror surface. In order to keep such bimetallic bending to an acceptable level over normal temperature variations, the plated nickel must be a thin and uniform layer with a thickness of, for example, approximately 0.0005 inch to approximately 0.001 inch. In order to achieve this thin and uniform layer, the beryllium blank must be made very precise prior to the final DPT operation, or the diamond tool will break through the electroless nickel layer and will require the extensive rework, drive up the blank cost, and increase cycle time.

For other inorganic material mirror substrates such as silicon carbide, there are similar issues regarding the achievable surface finish in the substrate material. Silicon carbide is formed through a number of different methods which include reaction bonding and sintering. Both of these methods leave the substrates less than 100% dense which creates surface finish defects on the optical surfaces when polished and limit the achievable surface finish to no better than 50 Angstroms RMS. A 50 Angstrom RMS finish is generally problematic for most visible wavelength applications due to optical scatter and therefore an alternate approach is needed.

Turning now to an overview of the aspects of the invention, one or more embodiments of the invention address the above-described shortcomings by providing apparatuses and methods of making thereof with a mirror that includes a substrate including an inorganic material that is non-diamond point turnable. As used herein, "non-diamond point turnable" and other like terms means that when diamond turning the material, specular optical surfaces are not achievable due to either the material composition, or the excessive amount of diamond tool wear which rapidly dulls the tool beyond a useful state In some aspects of the present invention, the inorganic material is a non-metal. A finish layer is arranged on the surface of the substrate, and the finish layer is polished on the surface opposite the substrate. The apparatuses further include a reflective layer on the polished surface of the finish layer. In some embodiments, the apparatuses include a binding layer between the substrate and the finish layer.

The present invention provides a number of technical advantages. One such advantage involves the provision of a mirror having a reflective surface with a high degree of smoothness, for example in the range of about 5 to 15 Angstroms RMS, depending on the specific structure of the mirror. This degree of smoothness is particularly advantageous when the mirror is used for radiation with relatively short wavelengths less than about 3 microns, such as visible radiation. A further advantage is that such a mirror can be fabricated with non-aluminum-based materials, such as silicon carbide and beryllium that are not-diamond-turnable but are much stiffer and lighter than aluminum. The mirror is thus easier and cheaper to make than pre-existing mirrors but is also more accurate in terms of surface finish which reduces scatter and surface figure which improves optical imaging performance.

Another advantage is that, by finishing the surface of the finish layer using a polishing operation rather than diamond point turning, the finish layer can be a thin-film layer which is sufficiently thin so that the finish layer and the substrate do not exhibit a bi-metallic effect that causes bending of the mirror in response to temperature variations. Still another advantage is that the single diamond point turning operation and the formation of the various thin-film layers can be carried out using known equipment and techniques, thereby avoiding the need for development and/or purchase of custom manufacturing equipment.

Turning now to a more detailed description of aspects of the present invention, FIG. 1 depicts a fragmented cross-sectional side view of a mirror 100 (also referred to as a mirrored apparatus) according to aspects of the present invention. The mirror 100 has a high-precision surface 107 that can reflect radiation, as indicated diagrammatically by broken-line arrows 109. The mirror 100 of FIG. 1 is designed for use with visible radiation but could alternatively be used with other types of radiation. The surface 107 is an aspheric surface, although the portion of the mirror 100 that is visible in FIG. 1 is sufficiently small so that the curvature of the surface 107 is not apparent in FIG. 1. The invention has aspects which are advantageous in the context of an aspheric mirror surface, such as the surface 107, but the invention is not limited to aspheric surfaces.

The mirror 100 has a substrate 102, which includes an inorganic material in some aspects of the present invention. Non-limiting examples of inorganic materials include beryllium, additive manufactured materials, non-additive manufactured materials, or any combination thereof. In other aspects of the present invention, the inorganic material is a non-metal, inorganic material. Non-limiting examples of non-metal, organic materials for the substrate 102 include silicon carbide, ceramic composite materials, additive manufactured materials, non-additive manufactured materials, or any combination thereof. In one or more aspects of the present invention, the substrate 102 consists of, or consists essentially of, the inorganic material or the non-metal, inorganic material. In some aspects of the present invention, the substrate 102 further comprises an oxide (e.g., aluminum oxide, silicon oxide, titanium oxide, tungsten oxide, or magnesium oxide), a nitride (e.g., silicon nitride), a carbide (e.g., silicon carbide), or any combination thereof.

The substrate 102 has a surface 103 thereon. The surface 103 is a not suitable for machining by single point diamond turning (DPT) and therefore non-diamond point turnable.

The surface 103 of the substrate 102 can be optically finished by traditional grinding and polishing processes known in the trade.

A finish layer 104 is deposited on the surface 103 of the substrate 102 using a thin-film vapor deposition technique. Non-limiting examples of thin film deposition methods include chemical vapor deposition (CVD), physical vapor deposition (PVD), atomic layer deposition (ALD), dual ion beam sputtering (DIB S), magnetron sputtering, or a combination thereof.

The finish layer 104 is an inorganic material. Non-limiting examples of materials for the finish layer 104 include silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

The thickness of the finish layer 104 varies depending on the type of material, substrate 102, and particular application in which the mirror 100 is used. According to some aspects of the present invention, the finish layer 104 has a thickness of about 1 micrometer to about 20 micrometers. According to other aspects of the present invention, the finish layer 104 has a thickness of about 1 to about 10 micrometers.

The finish layer 104 is radiation hardened. As used herein, "radiation hardened" means that the finish layer does not blister, peel, crack, or melt after being exposed to at least a 30 megarads total ionizing dose, at least a $1.43 \times 10^{13}$ neutrons/cm$^2$ (1 MeV equivalent) displacement damage dose, or a combination thereof.

The finish layer 104 has a surface 105 on a side thereof opposite from the substrate 102. The surface 105 is initially somewhat rough because the finish layer 104 is a thin-film layer, and thus its upper surface will conform to some degree to the contour of the surface 103 on the substrate 102, which may have some defects or artifacts. Therefore, in order to remove peak-to-valley variations in the surface 105, the surface 105 is polished.

Polishing of the surface 105 is carried out using a polishing compound and a polishing element or pad. The polishing compound is, for example, a material available commercially under the tradename K-SPRAY DIAMOND ABRASIVE, type SJK-5, size 0.0-0.2 micrometers, formula K-285T. However, any other suitable material could alternatively be used as the polishing compound. The polishing element is a part available commercially under the tradename TAC'N STIK REUSABLE ADHESIVE. However, any other suitable element could alternatively be used as the polishing element. Additionally, a final figure correction polishing process could be used to improve the overall shape of the mirror using commercially available CNC polishing equipment or other methods such as ion beam figuring (IBF).

According to some aspects of the present invention, polishing the surface 105 removes approximately 500 Angstroms of the material of the finish layer 104. After polishing, the resulting surface 105 has a surface finish of approximately 10 to 25 Angstroms RMS, but could be less than 10 Angstrom RMS.

A thin reflective layer 106 is then formed on the surface 105 of the finish layer 104 using a thin-film vapor deposition technique. Non-limiting examples of thin film deposition methods include CVD, PVD, ALD, DIBS, magnetron sputtering, or any combination thereof. According to one or more aspects of the present invention, the reflective layer 106 has a thickness of about 2,000 to about 5,000 Angstroms, but it could alternatively have any other suitable thickness that depends on the type of material and particular application. Non-limiting examples of materials for the reflective layer 106 include silver, gold, aluminum, or any combination thereof. The outer surface of the reflective layer 106 serves as the reflective surface 107. Since the reflective layer 106 is a thin-film layer provided on the surface 105 of the underlying finish layer 104, the surface 107 on the reflective layer 106 has a surface finish comparable to that of the surface 105 of the finish layer 104, or in other words a surface finish of approximately 10 to 25 Angstroms RMS.

A thin overcoat, which is not shown in the drawings, may be applied over the reflective layer 106 to protect the reflective layer 106 and/or to increase the reflectance within a selected waveband. For example, if the mirror 100 was intended for use with radiation in the visible and near infrared wavebands, an overcoat of silicon dioxide ($SiO_2$) with a thickness of about 1,500 Angstroms could be applied over the reflective layer 106 using well-known techniques. However, there is a wide variety of other known materials that, depending on the particular intended use for the mirror 100, could alternatively be used for the overcoat, including but not limited to silicon oxide, tantalum oxide, titanium oxide, zirconium oxide, or any combination thereof.

Figure 2:
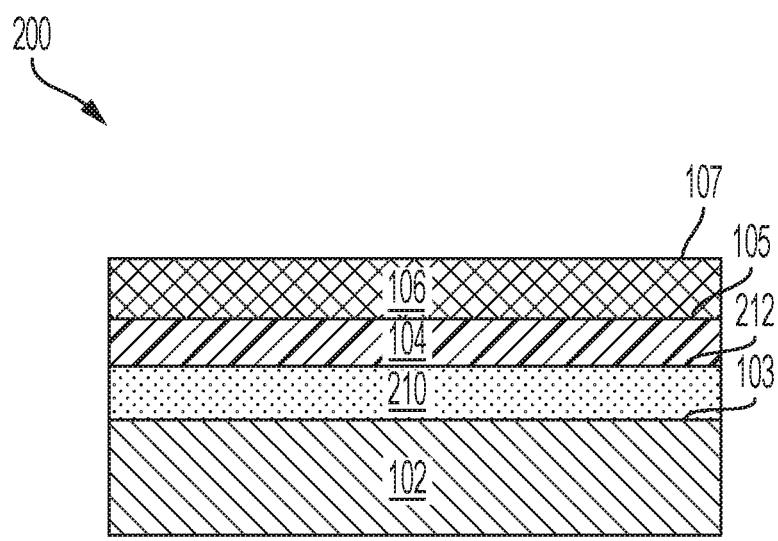
FIG. 2 depicts a fragmented cross-sectional side view of a mirror according to aspects of the present invention.

FIG. 2 depicts a fragmented cross-sectional side view of a mirror 200 (also referred to as a mirrored apparatus) according to aspects of the present invention, which is similar to FIG. 1 but shows another aspect with a binding layer 210 arranged between the substrate 102 and the finish layer 104. More specifically, the surface 103 on the substrate 102 is finished, as discussed above in association with FIG. 1. Then, the binding layer 210 is deposited on the surface 103 of the substrate 102 using thin-film vapor deposition techniques.

Non-limiting examples of materials for the binding layer 210 include is titanium, nickel, nickel chromium, chromium, gold, aluminum, molybdenum, germanium, zinc sulfide, or any combination thereof. The binding layer 210 has a thickness of about 100 to about 1000 Angstroms but could alternatively have some other suitable thickness.

The finish layer 104 is then deposited on the surface 212 of the binding layer 210, using thin-film vapor deposition techniques, in the manner described above in association with FIG. 1.

The purpose of the binding layer 210 is to improve adherence between the surface of the additive aluminum substrate 102 and the finish layer 104. Spatter from the additive laser sintering process can create unwanted aluminum and magnesium oxide defects that can cause surface quality defects, such as pinholes and pullouts, during subsequent finishing operations. Since the finish layer 104 is a thin-film layer, it will also benefit from the hardness of the binding layer 210. In particular, when the surface 105 of the finish layer 104 in FIG. 2 is polished in the same manner described above in association with FIG. 1, the presence of the intermediate binding layer 210 below the finish layer 104 will allow the surface 105 to have a higher degree of smoothness and better surface quality in the mirror 200 of FIG. 2 than in the mirror 100 of FIG. 1. In particular, the surface 105 in FIG. 2 will have a surface finish of approximately 10 to 15 Angstroms RMS.

Figure 3:
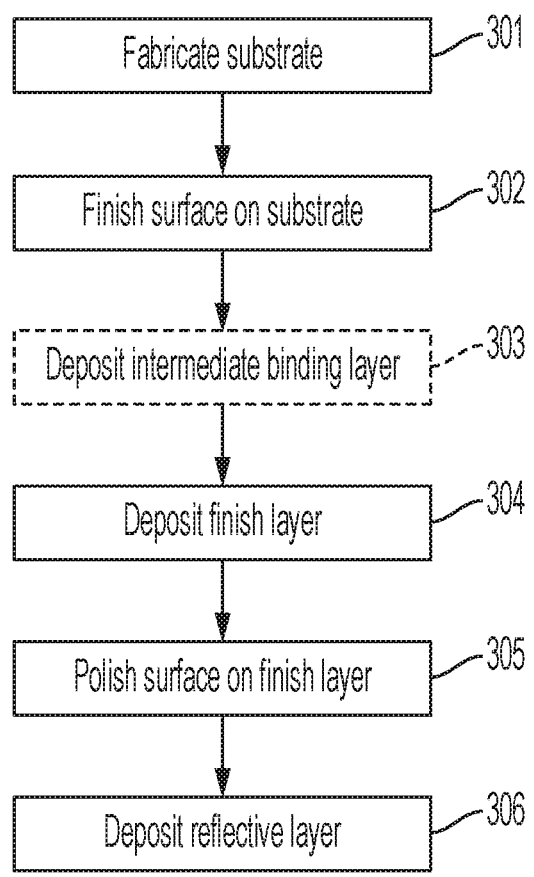
FIG. 3 is a flowchart showing a process that can be used to make mirrors according to aspects of the present invention.

FIG. 3 is a flowchart showing a process which can be used to fabricate each of the mirrors 100, 200 of FIGS. 1 and 2. The process begins at block 301, where the substrate 102 is fabricated. As discussed above, the substrate 102 in each disclosed embodiment is made from an inorganic material, for example, silicon carbide or beryllium. At block 302, the surface 103 on the substrate 102 is finished using traditional optical finishing processes known in the trade.

Block 303 is shown in broken lines in FIG. 3 to indicate that block 303 is carried out during fabrication of the mirror 200 of FIG. 2 but is not carried out during fabrication of the mirror 100 of FIG. 1. In block 303, the binding layer 210 is formed on the surface 103 of the substrate 102, using thin-film vapor deposition techniques.

In block 304, the finish layer 104 is formed using thin-film vapor deposition techniques. As discussed above, non-limiting examples of the finish layer 104 include silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

In block 305, the surface 105 of the finish layer 104 is polished in the manner explained above. This yields a surface finish of approximately 10 to 25 Angstroms RMS, depending on the type of materials used and whether an intermediate binding layer is present.

In block 306, the thin reflective layer 106 is formed over the surface 105 of the finish layer 104 using a thin-film vapor deposition technique. As discussed above, the reflective layer 106 can be silver, gold, or aluminum, for example.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A mirrored apparatus comprising:
   a non-diamond point turnable substrate comprising a non-metal inorganic material that is non-diamond turnable;
   a finish layer arranged on the surface of the substrate, the finish layer having a polished surface opposite the substrate; and
   a reflective layer arranged on the polished surface of the finish layer.

2. The mirrored apparatus of claim 1, wherein the non-metal inorganic material is silicon carbide.

3. The mirrored apparatus of claim 1, wherein the non-metal inorganic material is a ceramic composite material.

4. The mirrored apparatus of claim 1, wherein the substrate further comprises an oxide, a nitride, a carbide, or any combination thereof.

5. The mirrored apparatus of claim 1, wherein the substrate further comprises aluminum oxide, silicon oxide, titanium oxide, tungsten oxide, magnesium oxide, silicon carbide, silicon nitride, or any combination thereof.

6. The mirrored apparatus of claim 1, wherein the finish layer is radiation hardened and does not blister, peel, crack, or melt after being exposed to at least a 30 megarads total ionizing dose, at least a $1.43\times10^{13}$ neutrons/cm$^2$ (1 MeV equivalent) displacement damage dose, or a combination thereof.

7. The mirrored apparatus of claim 1, wherein the finish layer has a thickness of about 1 to about 20 micrometers.

8. The mirrored apparatus of claim 1, wherein the finish layer is silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

9. A mirrored apparatus comprising:
   a non-diamond point turnable substrate comprising an inorganic material that is non-diamond point turnable;
   a finish layer arranged on a surface of the substrate, the finish layer having a polished surface opposite the substrate; and
   a reflective layer arranged on the polished surface of the finish layer.

10. The mirrored apparatus of claim 9, wherein the inorganic material is beryllium.

11. The mirrored apparatus of claim 9, wherein the substrate further comprises an oxide, a nitride, a carbide, or combination thereof.

12. The mirrored apparatus of claim 9, wherein the substrate further comprises aluminum oxide, silicon oxide, titanium oxide, tungsten oxide, magnesium oxide, silicon carbide, silicon nitride, or any combination thereof.

13. The mirrored apparatus of claim 9, wherein the finish layer is radiation hardened and does not blister, peel, crack, or melt after being exposed to at least a 30 megarads total ionizing dose, at least a $1.43\times10^{13}$ neutrons/cm$^2$ (1 MeV equivalent) displacement damage dose, or a combination thereof.

14. The apparatus of claim 9, wherein the finish layer is silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

15. A method of making a mirrored apparatus, the method comprising:
- providing a non-diamond point turnable substrate comprising an inorganic material that is non-diamond point turnable;
- depositing a finish layer on the surface of the substrate;
- polishing a surface of the finish layer opposite the substrate; and
- depositing a reflective layer on surface of the finish layer.

16. The method of claim 15, wherein the inorganic material is silicon carbide.

17. The method of claim 15, wherein the inorganic material is beryllium.

18. The method of claim 15, wherein the substrate further comprises an oxide, a nitride, a carbide, or combination thereof.

19. The mirrored apparatus of claim 15, wherein the finish layer is radiation hardened and does not blister, peel, crack, or melt after being exposed to at least a 30 megarads total ionizing dose, at least a $1.43 \times 10^{13}$ neutrons/cm$^2$ (1 MeV equivalent) displacement damage dose, or a combination thereof.

20. The method of claim 15, wherein the finish layer is silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

* * * * *